April 16, 1963 G. A. HARTLE 3,085,352
FOOD PROCESSING TRAY

Filed Oct. 10, 1960 2 Sheets-Sheet 1

INVENTOR.
GLENN A. HARTLE
BY *Philip Sufkow*
*Max Geldin*
ATTORNEY

April 16, 1963 G. A. HARTLE 3,085,352
FOOD PROCESSING TRAY
Filed Oct. 10, 1960 2 Sheets-Sheet 2
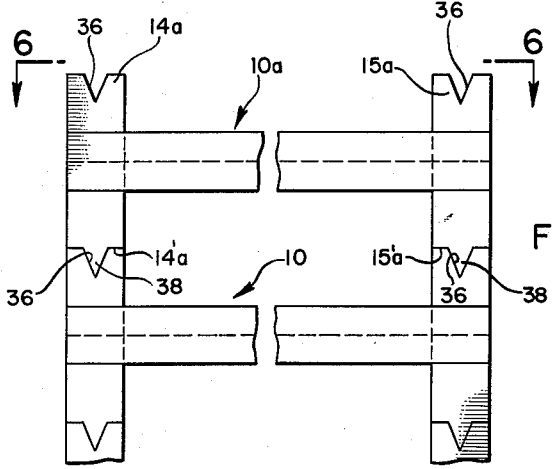
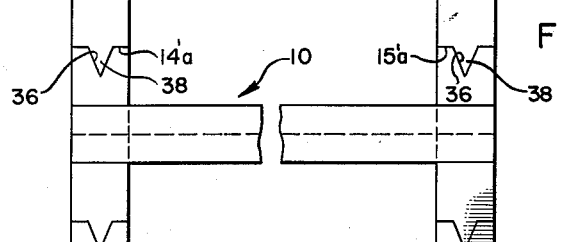
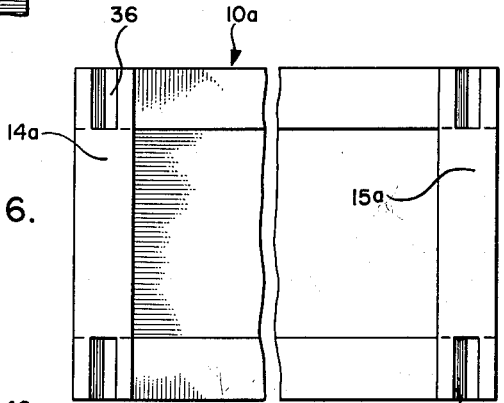
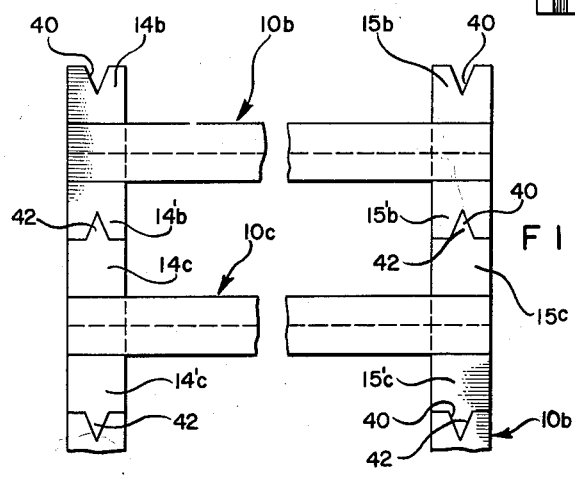
INVENTOR.
GLENN A. HARTLE
BY
ATTORNEY

United States Patent Office 3,085,352
Patented Apr. 16, 1963

3,085,352
FOOD PROCESSING TRAY
Glenn A. Hartle, Paramount, Calif., assignor, by mesne assignments, to Farrington Sanford Corporation, Needham Heights, Mass., a corporation of Massachusetts
Filed Oct. 10, 1960, Ser. No. 61,480
4 Claims. (Cl. 34—238)

This invention relates to trays which are particularly adapted for handling foods being subjected to various processing operations, such as drying.

In food processing plants, it is common practice to place the food, e.g. onions in chopped or comminuted form, which are to be subjected to drying, in large relatively flat wooden trays and to stack the trays in tiers, e.g. on a conveyor. The trays are designed to permit passage of drying air across them. Following drying the dried food is removed from the trays.

The use of wood for constructing these trays presents certain problems. In the first instance the wood tends to deteriorate over relatively short period under the conditions of temperature and humidity to which they are repeatedly subjected, and in the presence of the various foods positioned thereon. Further, and of particular significance it is common practice to employ screws or similar mechanical means in removing the food from these trays following processing, and in this operation the screws or equivalent mechanical means often strike and damage the wood of which the trays are constructed, chipping and otherwise damaging their surfaces. This necessitates substantial repair operations and replacement of trays, with consequent expense as well as inconvenience and delay often resulting.

It is an object of this invention to provide a metal food processing tray which can be subjected to food processing operations without deleterious effect on the food thereon, and which is not subject to deterioration or damage by the conditions of processing or by screws or other mechanical means employed in placing the food on the trays or removing it following the processing operation or operations.

Another object is to provide metal food processing trays of novel structure, and formed from a minimum number of sheet metal parts welded together.

Still another object is the provision of aluminum food processing trays having a coating thereon rendering the surface of such trays particularly resistant to corrosion and wear.

Yet another object is to afford durable, relatively inexpensive metal food processing trays which retain their shape over long periods of constant handling.

Another object is to afford trays of the foregoing type which are reversible.

A still further object is the provision of metal food processing trays which are provided with means which cooperate with adjacent trays when in stacked position to maintain the individual trays in fixed position, without shifting with respect to each other, when one or more of the trays is accidentally bumped or pushed.

The above and other objects are accomplished by forming the food processing tray from a metal, preferably sheet aluminum, employing in preferred practice a single sheet of aluminum to shape the bottom portion of the tray and to form a pair of longitudinally extending side wall portions or side rails which are disposed above and below the bottom of the tray. Such side wall portions each can be produced by bending the side portions of the sheet around in the form of a tube. A plurality of metal, e.g. aluminum, partitions or cross rails are positioned in spaced parallel relation transversely across the tray, with the opposite ends of such partitions resting on and connected, as by welding, to the opposite longitudinally extending side wall portoins or side rails of the tray. Such transverse partitions are positioned on opposite faces of the tray bottom portion, and extend from opposite sides of the tray bottom a distance greater than the height of the longitudinal side wall portions of the tray. The cross rails at opposite ends of the tray constitute the end walls of the tray. There are accordingly provided on opposite sides of the tray a plurality of separate receptacles or bins to receive food to be processed, and the trays are reversible.

When the trays are stacked one on top of the other, inlet and outlet air spaces are provided between adjacent vertically disposed side rails of adjacent trays and between adjacent cross rails for passage of drying air across the trays and over the food placed thereon to be processed, as described more fully below.

In order to maintain the trays in stacked vertical position, and to prevent misalignment, the trays are provided with means, preferably at the corners thereof, for locking each tray in position with respect to its adjacent trays above and below.

According to a particular feature of the invention, aluminum food processing trays, e.g. those of the aforementioned construction, are anodized to provide a hard anodic oxide film on the tray surfaces, to provide added protection of the surfaces from chemical attack and deterioration, and as a further protection against damage due to contact of such surfaces with mechanical elements such as screws used in removing food which has been processed, from the trays. Such anodic films can be provided by any suitable anodic oxidation process, but for provision of particularly hard, wear and corrosion resistant anodic films, the processes described in U.S. Patents 2,743,221 and 2,897,125 are preferably employed.

The term "aluminum" employed in the specification and claims is intended to denote pure aluminum or an alloy of aluminum in which aluminum is the major constituent.

The invention will be more clearly understood by reference to the description below taken in connection with the accompanying drawing wherein:

FIG. 4 is a section taken on line 4—4 of FIG. 1, showing the channel section of the transverse partitions or cross rails;

FIG. 5 illustrates a modification showing means for locking the adjacent vertically stacked trays against horizontal displacement with respect to each other;

FIG. 6 is a plan view of the locking means shown in FIG. 5, taken on line 6—6 of FIG. 5; and FIG. 7 illustrates a modification of the tray locking means shown in FIGS. 5 and 6.

Figure 1:
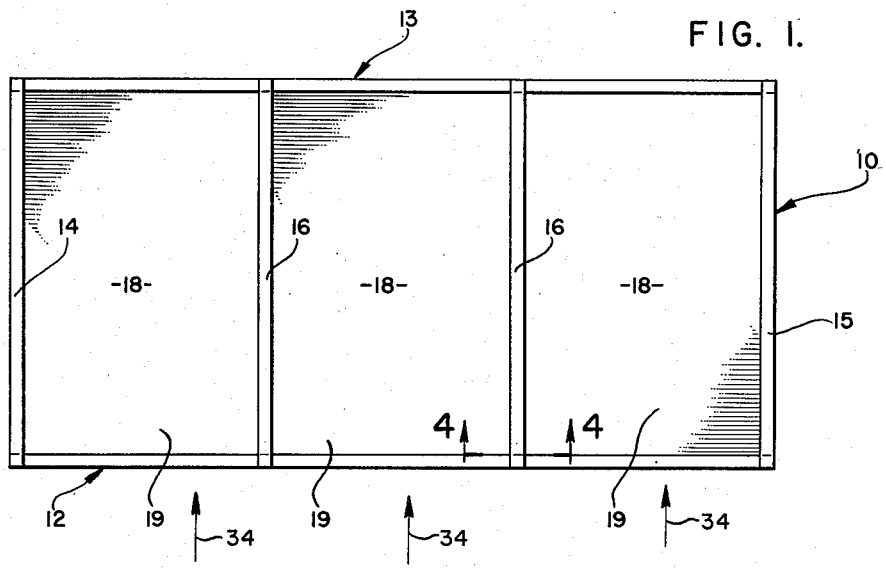
FIG. 1 is a plan view of a food processing tray according to the invention.

Referring to FIGS. 1 to 4 of the drawing, numeral 10 represents a food processing tray according to the invention, which comprises a bottom portion 18, side rails 12 and 13 extending along the longitudinal side edges of the tray, end rails 14 and 15 extending along the transverse edges at the ends of the tray, and cross rails 16 which are positioned parallel to the end rails 14 and 15 and spaced a substantially equal distance from the adjacent end rails and from each other. It will be understood that any number of intermediate partitions or cross rails 16 can be employed, forming a plurality of separate areas 19 on the tray for placement therein of food to be processed. Rails 12 and 13 are of equal height from the bottom 18 of the tray, and rails 14, 15 and 16 are also of equal height above the tray bottom 18.

Extending from the opposite side of the working surface 18 of the tray are positioned side rails 12' and 13', end rails 14' and 15', and intermediate cross rails 16'. Each of the primed numbers represent corresponding rails to those noted above, and positioned in direct alignment with the above noted rails. Rails 12', 13', 14', 15' and 16' extending equidistantly from the tray surface 18 with respect to the corresponding rails 12 to 16 described above. It will be noted, however, that end rails 14 and 15 and cross rails 16 extend a greater distance from the surface 18 of the tray than the side rails 12 and 13, and likewise the oppositely positioned end rails 14' and 15' and cross rails 16' extend a greater distance from the surface 18 of the tray than the side rails 12' and 13', for a reason noted hereinafter.

As an important feature of the invention, all of the components of the tray herein are formed of metal so that the tray is entirely composed of metal. A particularly suitable metal both from the standpoint of strength as well as lightness of weight is aluminum.

Figure 2:
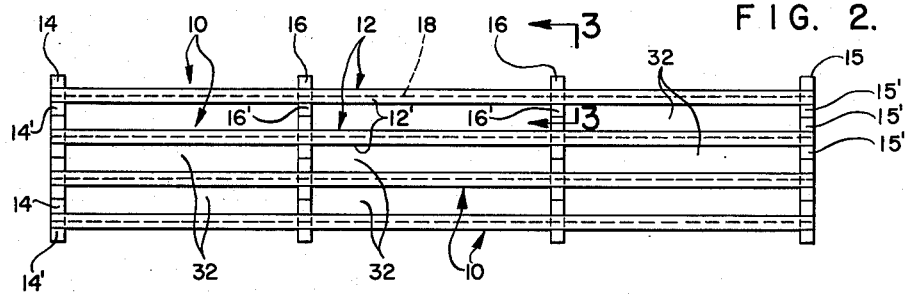
FIG. 2 is an elevation showing a vertical stack of trays of the type shown in FIG. 1.
Figure 3:
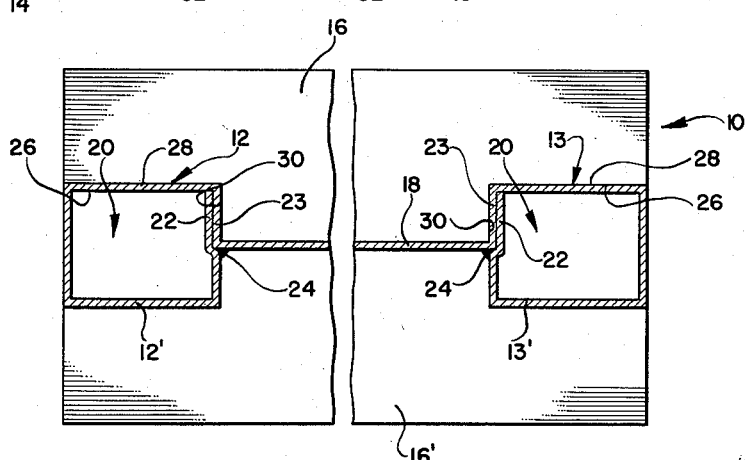
FIG. 3 is a section of one of the trays, taken on line 3—3 of FIG. 2.

According to a preferred embodiment, the processing tray illustrated in FIGS. 1 and 2, is formed of a metal sheet, preferably aluminum, a substantial portion of which comprises the bottom portion 18. The side portions of the aluminum sheet are bent to form like configurations as illustrated in FIG. 3. Thus, each of the side portions is bent into an essentially rectangular loop as indicated at 20 with the end portion 22 of the loop bent back unto an adjacent portion of the loop. The end 22 of the loop is securely connected to the initial portion 23 of the loop and to portion 18 of the sheet by welding, as indicated at 24. Thus it is seen that the loop 20 forms the rails 12 and 12' above and below the surface or bottom portion 18 of the tray. A similarly formed rectangular loop 20 is provided at the opposite side of the sheet 18 to form the opposite side rails 13 and 13' of the tray.

The end rails 14 and 15 and the intermediate cross rails 16 are provided in the following manner as illustrated in FIG. 3. A cross rail 16 having a channel section as seen in FIG. 4 is provided with like notches 26 at opposite lower corners of the rail. It will be noted that each of the notches 26 formed at opposite corners of the side rails 16 are of a size such as to fit over half of each of the loops 20 formed at opposite sides of the tray surface 18; that is, the notches 26 of rail 16 fit over the opposite side rails 12 and 13. The cross rails 16 are positioned in a plane perpendicular to the plane of the bottom portion 18 and are welded to the side rails 12 and 13 along the horizontal upper surface of the rails indicated at 28 and along the inner vertical surface of the rails as shown at 30. The end rails 14 and 15 are of the same shape as the cross rails 16 and are positioned on and connected to the ends of rails 12 and 13 in the manner described above with respect to cross rails 16.

In a similar manner described above, the cross rails 16' and the end rails 14' and 15', which are of the same shape as cross rails 16 and end rails 14 and 15, are positioned on the tray on the opposite side of the surface portion 18 from the rails described above.

In use, the food to be processed, for example dried, is placed in the various enclosed bins or areas 19 formed on the trays, and the trays are stacked in vertical alignment as illustrated in FIG. 2 with the end rails and cross rails of the respective trays placed one atop the other and with the respective side rails 12, 13 and 12', 13' of each of the stacked trays in vertical alignment. It will be noted that due to the much lower height of the side rails 12, 13 and 12,' 13', as compared to the end rails and cross rails, when the trays are stacked in a manner illustrated in FIG. 2, there is formed a series of passages indicated at 32 at opposite sides of the trays between adjacent vertically positioned side rails 12, 12' and 13, 13' of adjacent vertically stacked trays, and between adjacent cross rails, or cross rails and end rails. These spaces 32 permit the passage of drying air across and over the tops of the trays to produce an effective drying medium as indicated by arrows 34 in FIG. 1. When the food on the trays has been properly dried or processed, it can be removed in any suitable manner, for example, by screws or similar mechanical means without damage to the trays should these food removing elements make contact with portions of the metal tray.

In FIGS. 5 and 6 is shown a means for maintaining the trays in stacked vertical position as illustrated in FIG. 2, without the danger of one or more of the trays being displaced horizontally out of alignment with the adjacent vertically positioned trays. In FIGS. 5 and 6 the outer ends of the end rails 14a and 15a of the trays 10a are provided with V-shaped notches 36, and the outer ends of the lower end rails 14'a and 15'a are provided with V-shaped tongues 38 adapted to mate with the adjacent V-shaped slots 36 of an adjacent tray 10a. In this manner it will be seen that a series of trays can be stacked one atop the other with the mating grooves 36 and tongues 38 locked together, so that the individual trays cannot be accidentally pushed or displaced horizontally from the adjacent trays.

In another modification illustrated in FIG. 7 for locking the respective trays in vertical alignment, it will be noted that one series of trays 10b are each provided with V-shaped notches 40 at opposite ends of each of the end rails 14b and 15b, and 14'b and 15'b. Another series of trays 10c are each provided with V-shaped tongues 42 at opposite ends or corners of the end rails 14c and 15c, and 14'c and 15'c. Thus, trays 10b are designed to be placed alternatively in vertical relation with respect to trays 10c for locking the trays in vertical alignment. The advantage of employing the locking feature of FIG. 7 as compared to that of FIG. 6 is that the trays 10b and 10c are individually reversible, whereas only the entire stack of trays 10a is reversible.

While I have shown a preferred form of tray in which the side rails 12 and 13 are of the same height, and the cross rails 16 are of the same height, the tray can be constructed with one side rail 12 higher than the other side rail 13, and with cross rails 16 of different heights, provided however, that the cross rails 16 are of a height greater than the side rails. It is preferred that the end rails, e.g. 14 and 15, be of equal height and of a height greater than the side rails, and equal to or greater than the height of the intermediate cross rails.

As a particular feature of the invention I have found that food processing trays, e.g. of the type described and shown herein, are particularly efficient for food processing when aluminum or its alloys are employed in constructing the tray, and the tray surfaces are subjected to anodic oxidation, preferably under conditions to provide a hard wear resistant film on the surfaces of the tray. Effective anodic films of this type are obtained by subjecting the aluminum or aluminum alloy tray to anodic oxidation according to the processes described in U.S. Patents 2,743,221; 2,897,125; 2,855,350; 2,855,351 or 2,855,352. Anodic oxide films, ranging, for example, from about .0005" to about .003" can thus be formed on the tray hereof.

According to U.S. Patent 2,743,221, anodic oxidation to create a hard oxide film can be carried out by making the processing tray the anode in an electrolytic tank containing as an electrolyte chromic acid, sulfuric acid, oxalic acid, or equivalents thereof, preferably sulfuric acid, in which is present a minor amount of an aqueous extract of peat. According to the improvement of Patent 2,897,125, such anodic oxidation is carried out in a series of increasing voltage steps, to obtain increased thickness of oxide coat without burning of the part. In this process, sulfuric acid is the preferred electrolyte employing a concentration of sulfuric acid, for example, in the range from about 1 part to 20 parts by volume of concentrated (100%) sulfuric acid, in 100 parts by volume of water, e.g. about 5 to 7% by volume of 66 Baumé sulfuric acid. Also, about 1 to 6 parts, e.g. about 3 parts, by volume of the aqueous extract of peat is preferably employed. In this process low electrolyte temperatures are maintained from about 0° F. to 50° F., preferably in the range of 0 to 35° F. Hard dense oxide coatings of a thickness up to about .010″ or more may be obtained according to this process.

In the processes of U.S. Patents 2,855,350; 2,855,351 and 2,855,32, certain oxide coating accelerator additives are incorporated in the electrolyte in place of the aqueous extract of peat disclosed and described in U.S. Patent 2,897,125. Such oxide coating accelerators include, for example, 2-amino-ethyl sulfuric acid, taurine, alkyl taurines, e.g. N-methyl taurine, and sulfamic acid.

The disclosure of each of the above noted patents is incorporated herein by reference.

Illustrating the production of a hard anodic coating on the processing tray described in FIGS. 1 to 4 of the drawing, the processing tray, e.g. composed of 24 ST aluminum alloy, is connected to the anode of an electrolytic cell in the form of a stainless steel tank forming the cathode. The electrolyte is prepared by adding about 3% by volume of the aqueous extract of Georgia peat produced as described in U.S. Patent 2,743,221 or 2,897,125, to a water solution of sulfuric acid formed by the addition to water of about 7% by volume of 66 Baumé sulfuric acid.

The voltage is increased in about 1 to 2 volt increments each of about 2 minutes duration to a voltage of about 31 volts at which coating starts to form. Thereafter, voltage is increased in approximately 1 volt constant voltage increments each for about 2 minutes until a coating of about .001″ is formed at about 40 volts. Voltage is then increased in 2 volt constant voltage increments each for about 2 minutes duration up to about 50 volts, and from there in approximately 3 volt constant voltage increments each for about 2 minutes duration until a coating of about .002″ is produced at about 60 volts. The .002″ oxide coating thus produced on the processing tray is a hard, corrosion and wear resistant coating which efficiently protects the surfaces of the tray over extended periods of use.

From the foregoing, it is seen that the invention provides a novel food processing tray having many advantages over the heretofore employed food processing trays, particularly those constructed of wood in the conventional manner.

While I have described a particular embodiment of my invention for the purpose of illustration, it should be understood that various modifications and adaptations thereof may be made within the spirit of the invention as set forth in the appended claims.

I claim:
1. A food processing tray formed entirely of metal, comprising a bottom portion, formed of a metal sheet bent into a tubular formation at opposite sides thereof to form a first pair of opposite integral side rails on one face of said bottom portion and a second pair of opposite integral side rails on the other face of said bottom portion, all of said side rails extending substantially the same distance from said bottom portion, a first pair of end rails positioned transversely across said one face of said bottom portion, and a second pair of end rails positioned transversely across the other face of said bottom portion, a first plurality of cross rails of channel shaped cross section positioned transversely across said one face of said bottom portion, the opposite ends of said cross rails being notched and fitting over the opposite side rails, a second plurality of like cross rails positioned in like manner in alignment with said first plurality of cross rails on the other face of said bottom portion, all of said cross rails extending the same distance from said bottom portion, said last mentioned distance being greater than said first mentioned distance of said side rails from said bottom portion.

2. A food processing tray formed entirely of metal comprising a bottom portion formed of an aluminum sheet bent into a tubular formation at opposite sides thereof to form a first pair of opposite side rails on one face of said bottom portion and a second pair of opposite side rails on the other face of said bottom portion, all of said side rails extending substantially the same distance from opposite faces of said bottom portion, a first pair of end rails having a channel shaped cross section positioned transversely across said one face of said bottom portion, the opposite ends of said end rails being notched and fitting over the opposite side rails, a second pair of end rails having a channel shaped cross section positioned transversely across the other face of said bottom portion, the opposite ends of said end rails being notched and fitting over the opposite side rails, a first plurality of cross rails of channel shaped cross section positioned transversely across said one face of said bottom portion, the opposite ends of said cross rails being notched and fitting over the opposite side rails, a second plurality of like cross rails positioned in like manner in alignment with said first plurality of cross rails on the other face of said bottom portion, all of said end rails and cross rails extending the same distance from opposite faces of said bottom portion, said last mentioned distance being greater than said first mentioned distance of said side rails from said bottom portion.

3. A food processing tray formed entirely of metal comprising a bottom portion formed of an aluminum sheet bent into a tubular formation at opposite sides thereof to form a first pair of opposite side rails on one face of said bottom portion and a second pair of opposite side rails on the other face of said bottom portion, all of said side rails extending substantially the same distance from opposite faces of said bottom portion, a first pair of end rails positioned transversely across said one face of said bottom portion, the opposite ends of said end rails being notched and fitting over the opposite side rails, a second pair of end rails positioned transversely across the other face of said bottom portion, the opposite ends of said end rails being notched and fitting over the opposite side rails, a first plurality of cross rails positioned transversely across said one face of said bottom portion, the opposite ends of said cross rails being notched and fitting over the opposite side rails, a second plurality of like cross rails positioned in like manner in alignment with said first plurality of cross rails on the other face of said bottom portion, all of said end rails and cross rails extending the same distance from opposite faces of said bottom portion, said last mentioned distance being greater than said first mentioned distance of said side rails from said bottom portion.

4. A food processing tray as defined in claim 3, said aluminum sheet having a hard anodic oxide film formed thereon.

References Cited in the file of this patent
UNITED STATES PATENTS

| | | |
|---|---|---|
| 2,294,717 | Carney | Sept. 1, 1942 |
| 2,449,658 | La Macchia | Sept. 21, 1948 |
| 2,456,481 | Ballantyne et al. | Dec. 14, 1948 |
| 2,905,600 | Franklin | Sept. 22, 1959 |